United States Patent [19]
Winschel

[11] Patent Number: 6,102,158
[45] Date of Patent: Aug. 15, 2000

[54] PORTABLE TREE STAND WITH LEVELLING SEAT AND PLATFORM MEMBER

[76] Inventor: Herb G. Winschel, 1054 Country Rd. 506, Oak Ridge, Mo. 63769

[21] Appl. No.: 09/196,300

[22] Filed: Nov. 19, 1998

[51] Int. Cl.[7] ........................................ E04G 3/00
[52] U.S. Cl. ............................. 182/187; 182/188
[58] Field of Search ................... 182/187, 188, 182/135, 136; 248/188.2, 188.3, 242, 284.1, 291.1, 240, 249.1

[56] References Cited

U.S. PATENT DOCUMENTS

| | | |
|---|---|---|
| 3,485,320 | 12/1969 | Jones . |
| 4,942,942 | 7/1990 | Bradley . |
| 4,995,475 | 2/1991 | Berkbuegler . |
| 4,997,063 | 3/1991 | Bradley . |
| 5,090,506 | 2/1992 | Womack et al. . |
| 5,156,236 | 10/1992 | Gardner et al. . |
| 5,282,520 | 2/1994 | Walker ................. 182/187 X |
| 5,297,656 | 3/1994 | Amacker ................. 182/187 |
| 5,363,941 | 11/1994 | Richard . |
| 5,458,215 | 10/1995 | Burgin . |
| 5,482,137 | 1/1996 | McNeill . |
| 5,562,180 | 10/1996 | Herzog et al. ................. 182/187 |

Primary Examiner—Jerry Redman
Assistant Examiner—Hugh B. Thompson
Attorney, Agent, or Firm—Greensfelder, Hemker & Gale, P.C.

[57] ABSTRACT

A portable tree stand capable of being erected and levelled within a leaning tree is provided. The stand comprises a tree engaging support member which is pivotally connected to the frame of the stand. This arrangement allows the seat and platform of the stand to be adjusted to a level position when erected in a leaning tree where the direction of the lean of the tree is sideways with respect to the erected stand. A back rest is also provided to give support to the hunter.

10 Claims, 9 Drawing Sheets

PORTABLE TREE STAND WITH LEVELLING SEAT AND PLATFORM MEMBER

BACKGROUND OF THE INVENTION

When hunting for deer, or other such wildlife, it is desirable to gain the best tactical position available to increase one's field of vision and to place oneself out of the normal range of sight of the prey. Typically, hunters place themselves up in trees at a height sufficient to achieve the desired tactical position. There exist a large number of portable tree stands that help the hunter to accomplish this goal.

Practically all portable tree stands, however, require a straight, vertical tree so that, when erected, the hunter can sit or stand levelly. Because the frames comprising the seat and platform of such stands are generally fixed, the seat and platform will necessarily lie in the directional orientation of the tree to which the stand is attached. If a tree is slanted away from true vertical, the attached stand will also have that same slanted orientation. This creates a dangerous situation, as the hunter can easily fall out of the stand. Accordingly, such stands must be used on straight, vertical trees.

However, it is often the case that there are no straight vertical trees available in a prime hunting spot. It might happen to be that there are only slanted and leaning trees in that area. If so, the typical portable tree stand can not be safely erected. There do exist certain types of stands whose seats and platforms can be adjusted to provide limited levelling abilities where the tree is leaning towards or away from the perspective of the seated hunter. However, such stands presume an initial straight and vertically oriented erected positioning of the stand in the tree, with the levelling only affecting the distance of the seat and platform of the stand from the tree. All movement from such adjustments take place only in the common vertical plane between the tree and the stand. These types of stands would not be adapted for use in a tree where adjustment occurs obliquely to that common vertical plane such as when the direction of the lean of the tree is sideways with respect to the erected stand.

SUMMARY OF THE INVENTION

It is accordingly an object of this invention to provide a portable tree stand that can be erected in a leaning or slanting tree, and adjusted so that the seat and platform of the stand can be levelled. The stand is comprised of a seat member, a platform member and a back frame member forming the general stand structure, with a tree engaging support member connected thereto. The general stand structure is removably and pivotally connected to the tree engaging support member such that a range of angular orientations of connections between them can vary. The tree engaging support member is connected to and aligned in the general direction of the tree. The general stand structure is re-positioned and re-connected to the tree support member in an oblique orientation so that it achieves a level placement for the hunter to sit and stand even though the tree itself is slanted.

The back frame member of the general stand structure is provided with an array of spaced apertures along its width at one end to receive fasteners provided on the tree support member so that incremental changes of position can be selected. A single connection point is made between the other end of the back frame member and the tree support member. The back frame member and the tree support member pivot with respect to each other in a common plane at this connection point. The stand is merely pivoted along the tree support member to the desired level position and connected with the tree support member. In the event the slant of the tree is so great that it is out of position for the hunter to rest against it, a back seat rest, which can be retractable, is provided for the support of the hunter.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
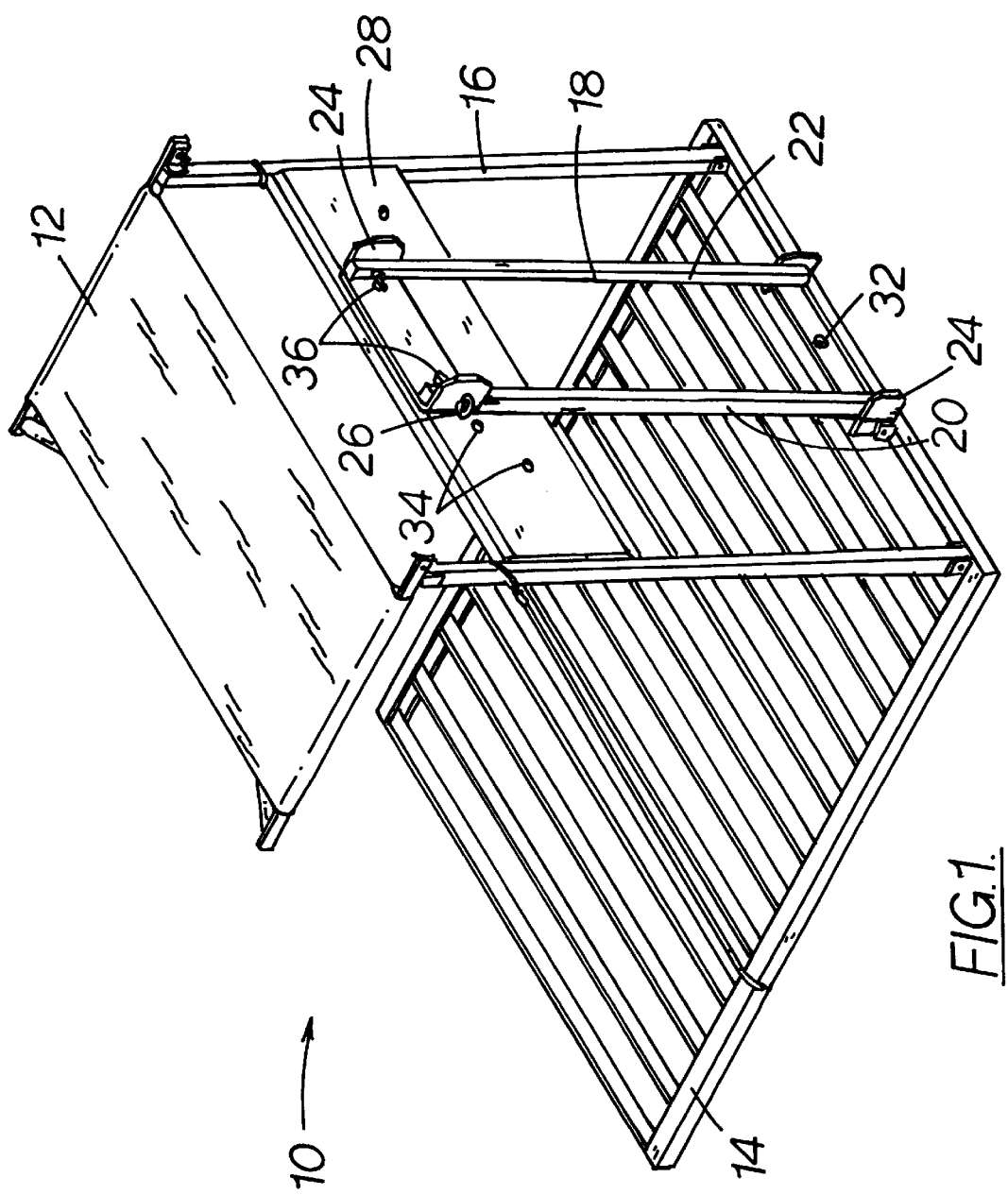
FIG. 1 is a perspective view of the stand from the rear.

The portable tree stand of the instant invention is generally indicated by the reference numeral 10 as shown in FIG. 1. It is comprised of a seat member 12, platform member 14, and back frame member 16 all of which may be formed from metal tubing. These various components can be made to pivot and fold back on one another into a compact arrangement for portability as is common in the art. A tree engaging support member 18 is connectable with the back frame member. Tree support member 18 may be comprised of parallel supports 20 and 22 with engaging brackets 24 for contact with a tree. Eyebolts 26 receive the ends of a securing chain which holds the support member 18 onto a tree. Support member 18, in turn, supports the stand.

Figure 2:
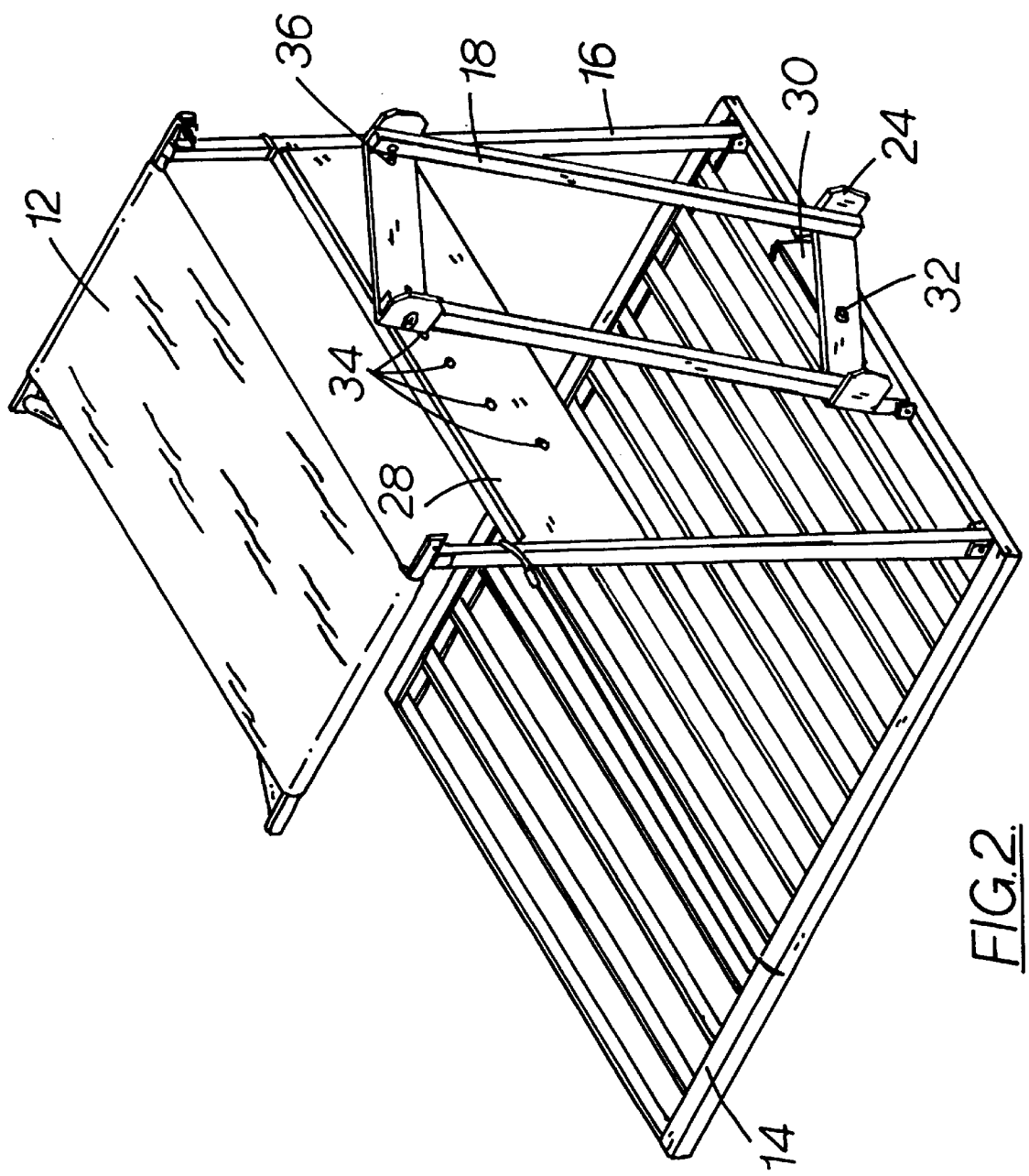
FIG. 2 is a perspective view of the stand from the rear showing the tree engaging support member oriented obliquely with the back frame member.
Figure 3:
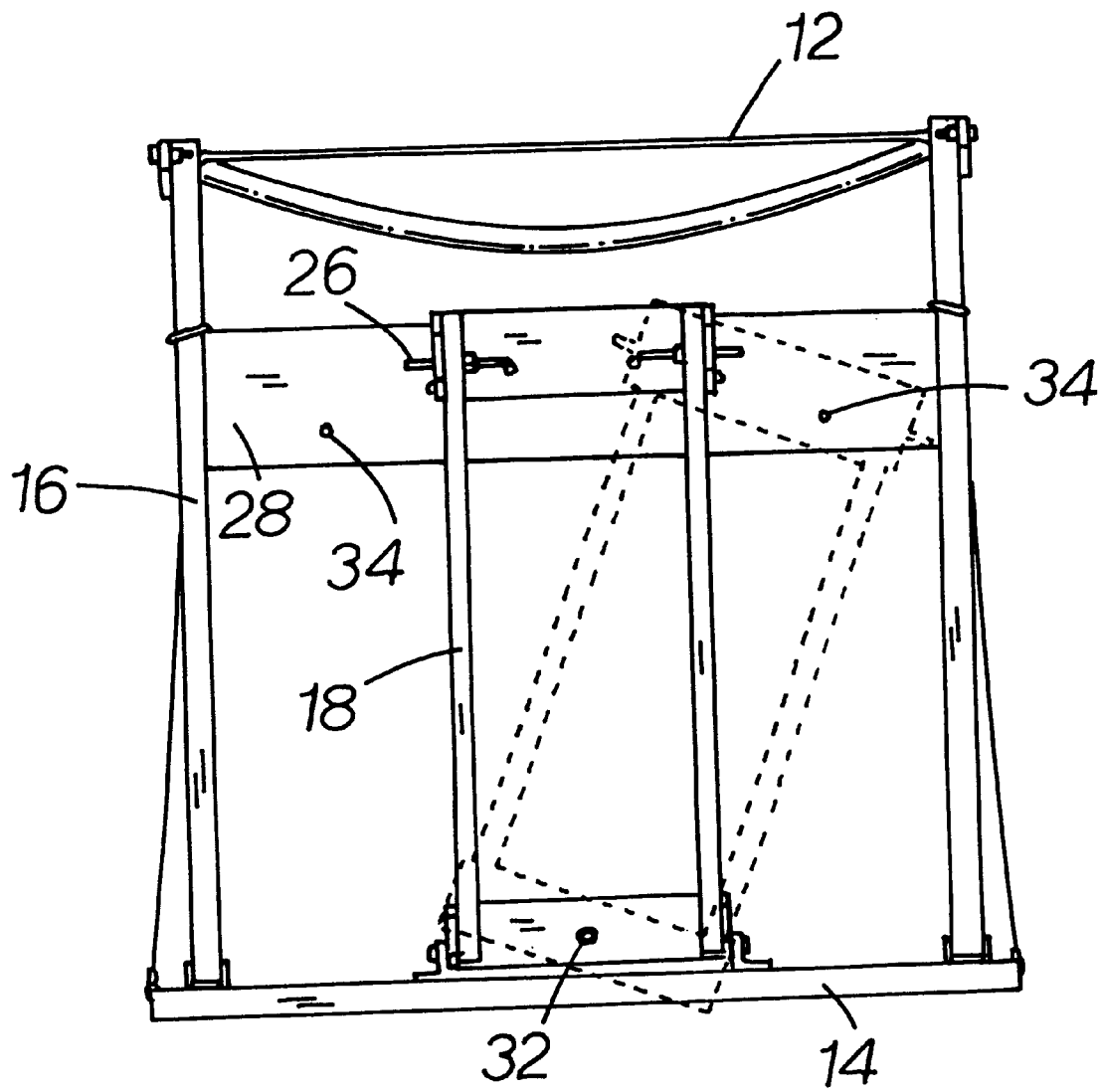
FIG. 3 is a view in side elevation taken from the rear showing the tree engaging support member aligned with the back frame member, and in phantom showing the tree engaging support member oriented obliquely with the back frame member.

Back frame member 16 comprises a cross brace member 28 to which a top portion of tree engaging support member 18 is connected. A support flange 30 is positioned at a rear edge of platform member 14 to serve as a brace plate to which a bottom portion of tree support member is connected. Cross brace member 28 and support flange 30 are provided with apertures, as are the top and bottom portions of tree engaging support member 18, whereby the respective apertures can be aligned for connection of the members by fasteners. The connection point 32 between support flange 30 and the bottom portion of tree support member 18 serves as a pivot point, and allows back frame member 16 to swing along a range of various oblique positions within the common plane of tree support member 18 as shown in FIGS. 2 and 3. An array of apertures 34 are provided along the span of cross brace member 28 to receive fasteners to connect the top portion of tree support member 18 at the various oblique positions. The apertures in cross brace member 28 are disposed in an arcuate arrangement corresponding to the positioning of the apertures in tree support member 18 when pivoted into the various oblique positions. Depending upon the number of apertures provided along the arcuate arrangement, incremental adjustments of the angular oblique positioning between tree support member 18 and back frame member 16 can be effected. Also, the pivot point can be made at the top of the tree support member on cross brace 28, and the arcuate array of apertures 34 being provided on support flange 30.

Figure 4:
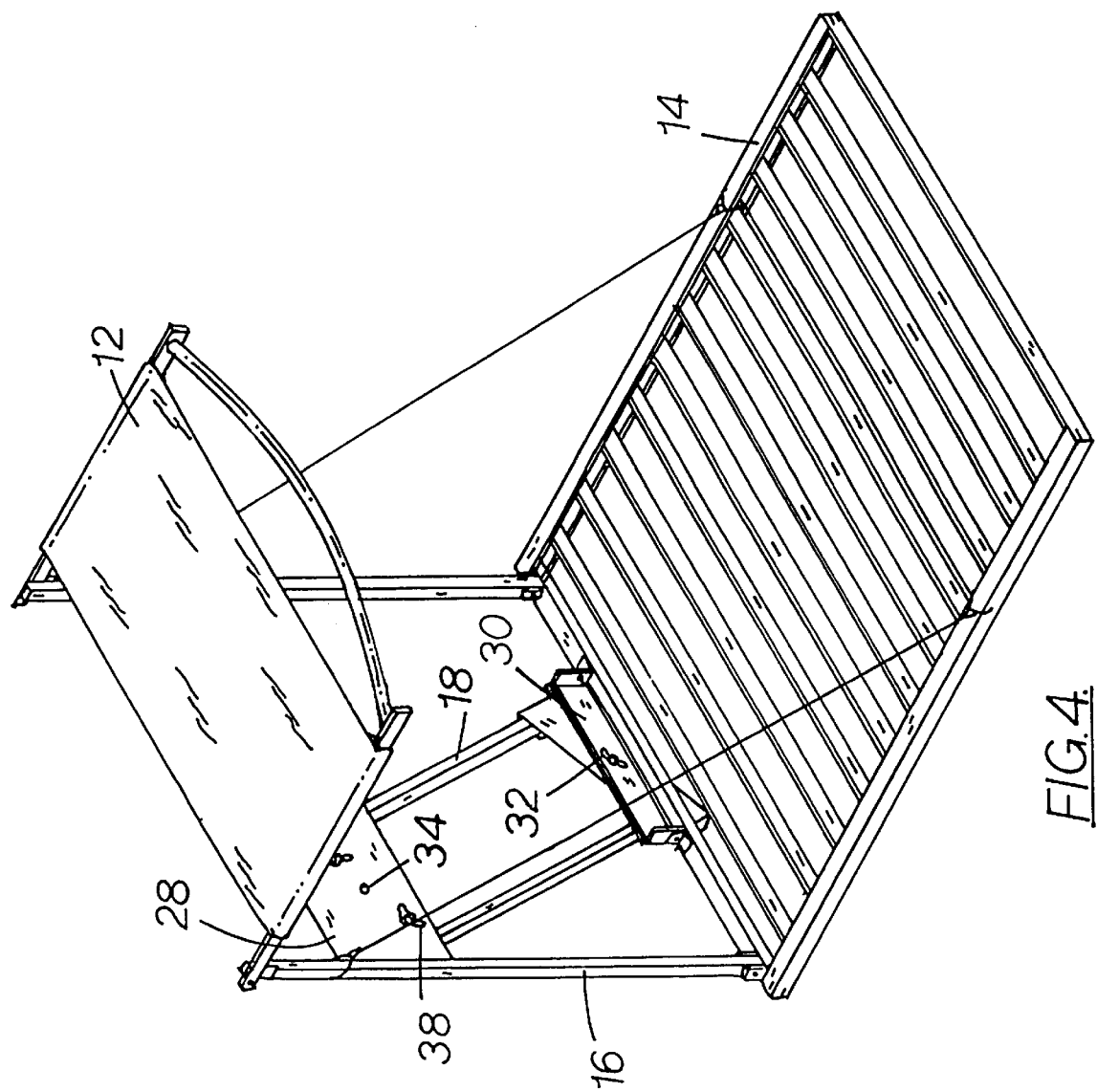
FIG. 4 is a perspective view of the stand from the front showing the tree engaging support member oriented obliquely with the back frame member.

Fasteners are best comprised of bolts 36 having wingnuts 38, as seen in FIG. 4, for ease in connection and disconnection. Because it is the back frame that moves in relation to the tree support member, bolts 36 are optimally disposed such that their heads and shafts are retained in tree support member 18 so that their threaded ends are received through the apertures 34 of cross brace member 28. A similar bolt and wingnut arrangement can be provided for connection point 32 at support flange 30.

Figure 7:
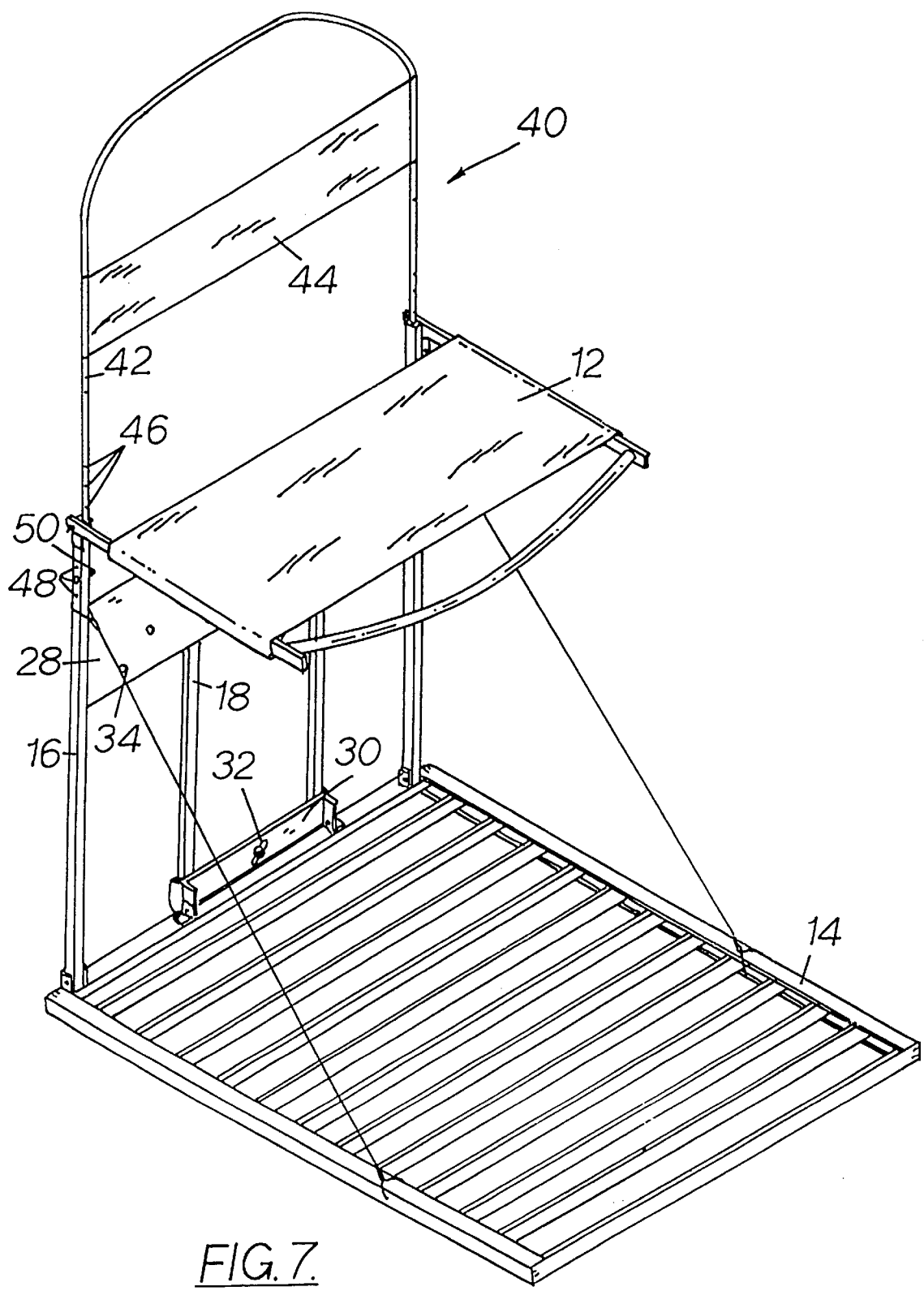
FIG. 7 is a perspective view showing the back rest member connected to the stand.
Figure 8:
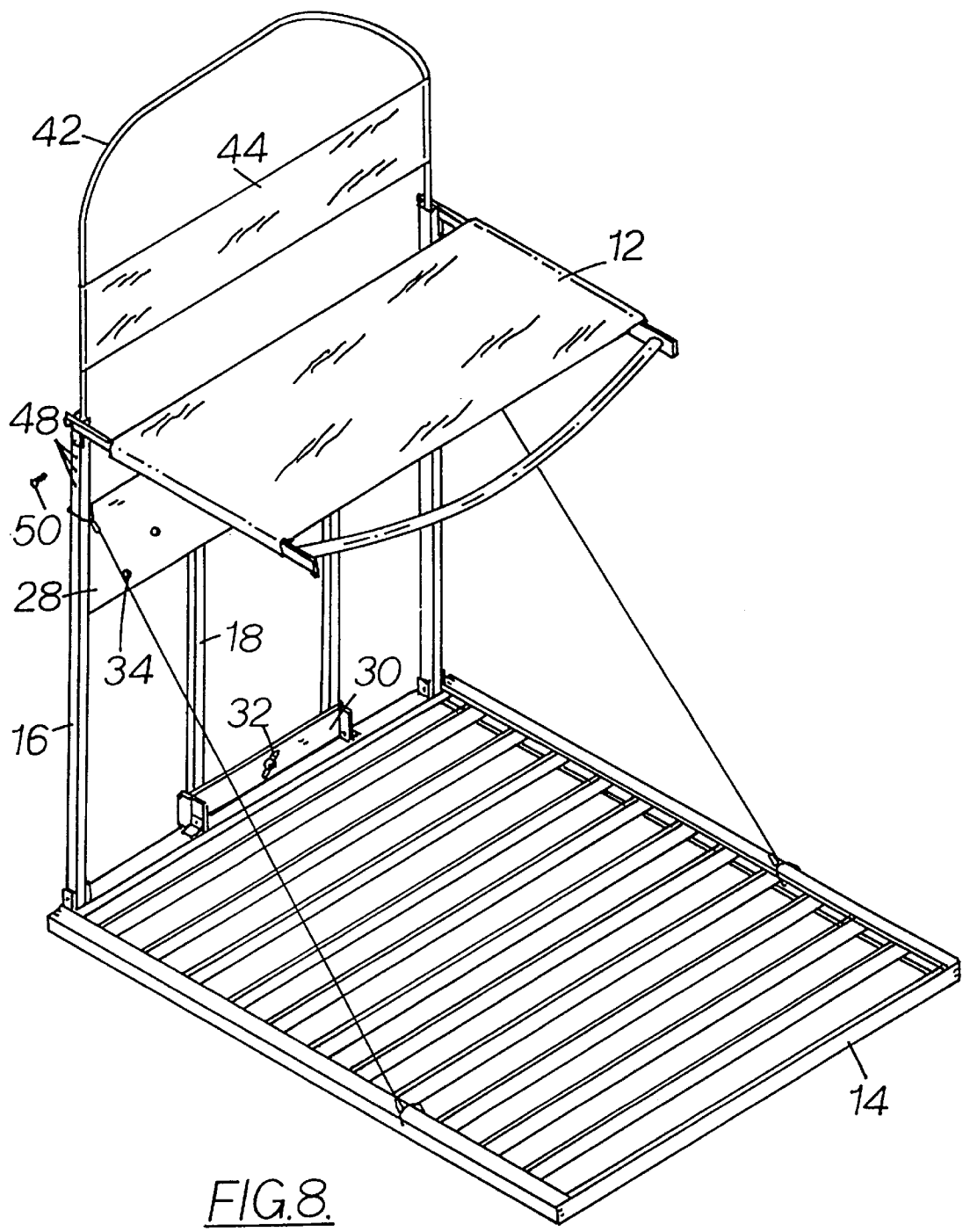
FIG. 8 is a perspective view showing the back rest member retracted within the stand.
Figure 9:
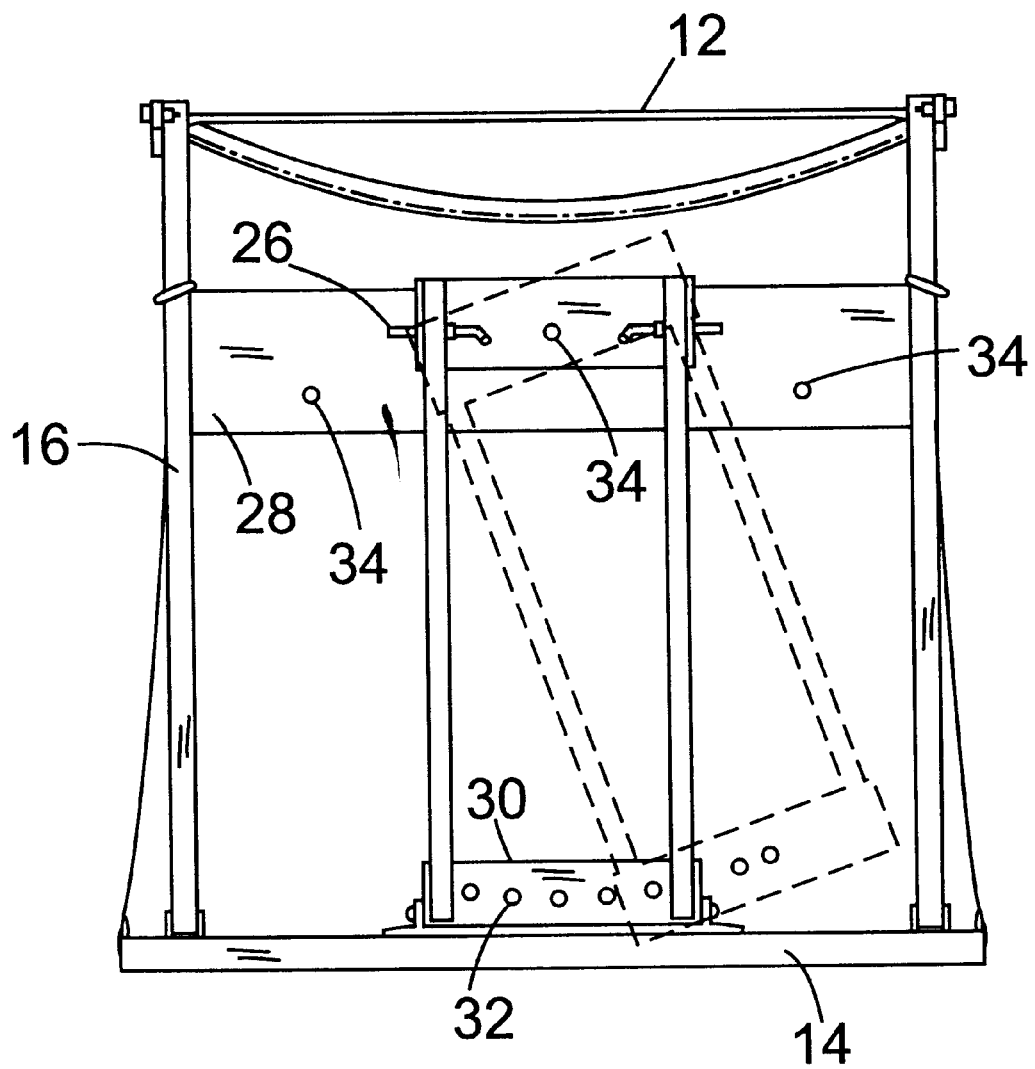
FIG. 9 is a perspective view showing a brace plate member having apertures.

A back rest 40 may be employed with the stand and is shown in FIGS. 7 and 8. It is comprised of U-shaped frame member 42 and back support element 44. Back frame member 16 may be comprised of hollow tubing to receive the legs of frame member 42. Back support element 44 may be comprised of canvas or other appropriate material. The height of back rest 40 is adjustable, and it may be retracted within back frame member 44, or pulled completely from the back frame, when not in use. Apertures 46 are provided in the bottom of each leg of frame member 42 and holes 48 are provided in back frame member. The respective apertures and holes are aligned, corresponding to the desired height of the back rest, and a linch pin 50 is used to connect frame member 42 within the back frame.

USE

Figure 5:
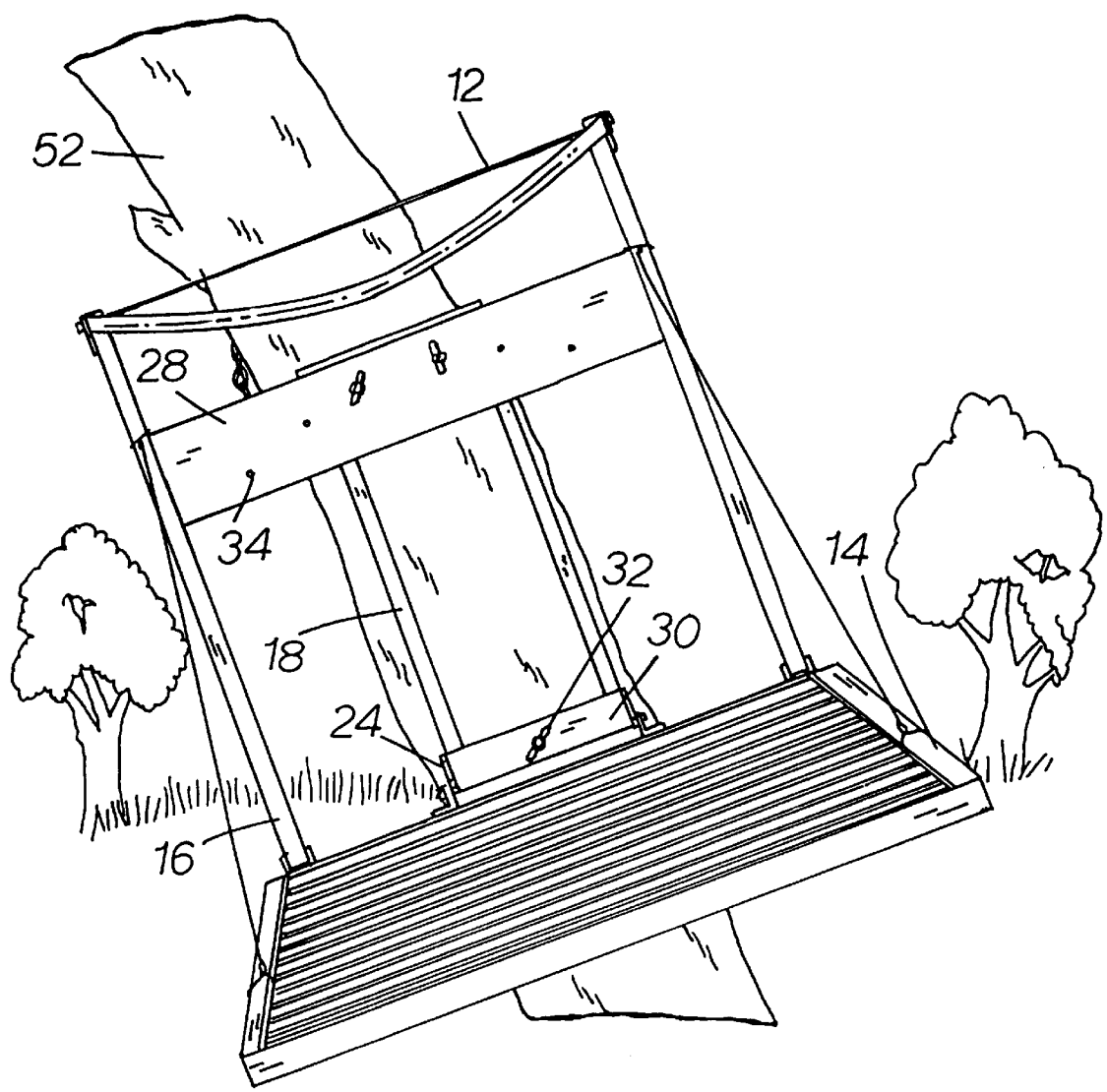
FIG. 5 is a perspective view showing the stand erected in a leaning tree, aligned in the direction of the tree.
Figure 6:
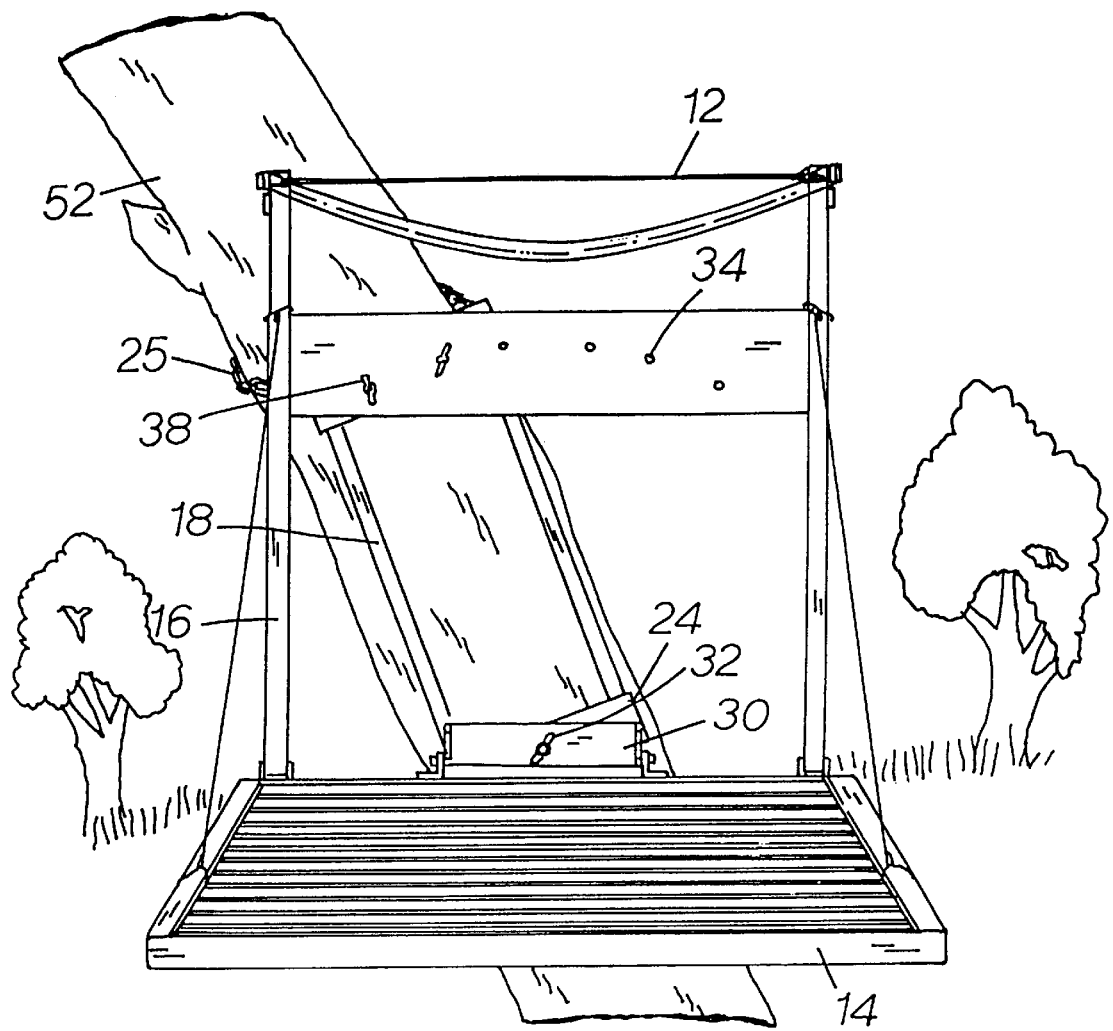
FIG. 6 is a perspective view showing the stand erected in a leaning tree, oriented obliquely to the direction of the tree.

The portable tree stand of the instant invention is very easily employed to provide a level seating position within a leaning tree 52 as shown in FIGS. 5 and 6. The tree is selected and approached so that the direction of the tree lean is to the right or left of the hunter. Tree engaging support member 18 is secured against the tree, being aligned with the direction of the trunk of the tree. Appropriate means for engaging the tree, such as a securing chain 25 anchored on eyebolts 26, are employed. Wingnuts 38 are removed from bolts 36 and back frame member 16 is pulled from engagement with tree support member 18. Back frame member 16 is then rotated about pivot point 32 to a sufficient degree to enable platform 14 and seat 12 to be leveled as shown in FIG. 6. Bolts 36 are passed through appropriate apertures 34 to connect back frame member 16 at its leveled position to tree support member 18. The more apertures that are provided in the arcuate arrangement in cross brace member 28, the greater the number of incremental positions that would be available to achieve optimal levelling.

For ease in erecting the tree stand, the connection at pivot point 32 can be made with a removable fastener so that the back frame member 16 can be completely separable from tree engaging support member 18. This would enable the hunter to first independently install the tree support member without the extra weight of the back frame member. This would also enable the hunter to remove the stand portion, i.e., back frame, seat and platform, from the tree support member to avoid theft when he leaves the area for an extended period of time. Also, such an arrangement would enable the hunter to erect a number of separate tree support members on trees in different locations, and be able to transport for interchangeable use a single unitary back frame, seat and platform among them.

Various changes and modifications may be made within this invention as will be apparent to those skilled in the art. Such changes and modifications are within the scope and teaching of this invention as defined in the claims appended hereto.

What is claimed is:

1. A portable tree stand comprising:

a seat member, a platform member positioned below said seat member, a back frame member, and a tree engaging support member pivotally connected at an end thereof to said platform member, said seat member and said platform member being connected to said back frame member at opposite ends thereof such that said seat member and said platform member are positioned parallel to each other, said tree engaging support member being attached to said back frame member at varying positions of angular orientation with respect to each other, whereby said back frame member is capable of being aligned obliquely within a common planar orientation of said tree engaging support member and a lengthwise surface of a tree, so that said seat member and said platform member of said stand are leveled when attached to said tree.

2. The portable tree stand of claim 1 in which said back frame member comprises a cross brace member, said cross brace member receiving an upper portion of said tree engaging support member, said platform member a lower portion of said tree engaging support member.

3. The portable tree stand of claim 2 in which said cross brace member receives said upper portion of said tree engaging support member at various positions along a span of said cross brace member.

4. The portable tree stand of claim 3 in which said cross brace member has a plurality of apertures disposed in an arcuate array along its span, and said tree engaging support member has at least one fastener, said fastener being receivable within at least one of said apertures, whereby said cross brace member connects with said tree engaging support member over a range of positions along said arcuate array of apertures.

5. The portable tree stand of claim 1 in which a back rest member is connected to said stand.

6. The portable tree stand of claim 5 in which said back rest member is retractable within said back frame member.

7. A portable tree stand comprising:

a seat member, a platform member positioned below said seat member, a back frame member, and a tree engaging support member pivotally connected at an end thereof to said platform member, said seat member and said platform member being connected to said back frame member at opposite ends thereof such that said seat member and said platform member are positioned parallel to each other, said tree engaging support member being pivotally connected to said back frame member at varying positions of orientation with respect to each other, whereby said back frame member is capable of being aligned obliquely within a common planar orientation of said tree engaging support member and a lengthwise surface of a tree, so that said seat member and said platform member of said stand are leveled when attached to said tree.

8. The portable tree stand of claim 7 in which said back frame member comprises a brace plate member and a cross brace member, a first end of said tree engaging support member being connected to said brace plate member, and a second end of said tree engaging support member being connected to said cross brace member.

9. The portable tree stand of claim 8 in which said first end of said tree engaging support member is pivotally connected to said brace plate member, said cross brace member having a plurality of apertures disposed in an arcuate array along its span, said second end of said tree engaging support member having at least one fastener, said fastener being receivable within any of said apertures, whereby said cross brace member is removably connected with said tree engaging support member over a range of positions along said arcuate array of apertures.

10. The portable tree stand of claim 8 in which said second end of said tree engaging support member is pivotally connected to said cross brace member, said brace plate member having a plurality of apertures disposed in an arcuate array along its span, said first end of said tree engaging support member having at least one fastener, said fastener being receivable within any of said apertures, whereby said brace plate member is removably connected with said tree engaging support member over a range of positions along said arcuate array of apertures.

\* \* \* \* \*

UNITED STATES PATENT AND TRADEMARK OFFICE
CERTIFICATE OF CORRECTION

PATENT NO. : 6,102,158
DATED : August 15, 2000
INVENTOR(S) : Herb G. Winschel

Page 1 of 1

It is certified that error appears in the above-identified patent and that said Letters Patent is hereby corrected as shown below:

Claim 2,
Line 4, after "platform member" insert -- receiving --.

Signed and Sealed this

Seventh Day of August, 2001

*Attest:*

NICHOLAS P. GODICI
*Attesting Officer*     *Acting Director of the United States Patent and Trademark Office*